(12) United States Patent
Isago

(10) Patent No.: US 6,527,384 B2
(45) Date of Patent: Mar. 4, 2003

(54) DECOLORIZABLE INK COMPOSITION AND INK JET PRINTER USING THE INK COMPOSITION

(75) Inventor: Kohki Isago, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/840,173

(22) Filed: Apr. 24, 2001

(65) Prior Publication Data

US 2002/0175982 A1 Nov. 28, 2002

(30) Foreign Application Priority Data

Apr. 25, 2000 (JP) ........................................ 2000-124780

(51) Int. Cl.$^7$ ................................................. B41J 2/01
(52) U.S. Cl. ........................ 347/100; 347/101; 347/102
(58) Field of Search ................................ 347/100, 101, 347/102, 103, 96; 106/31.32

(56) References Cited

U.S. PATENT DOCUMENTS 5,922,115 A * 7/1999 Sano et al. ............... 106/31.32
6,017,386 A * 1/2000 Sano et al. ............... 106/31.32

FOREIGN PATENT DOCUMENTS

EP 0 987 123 3/2000

* cited by examiner

Primary Examiner—John Barlow
Assistant Examiner—Manish S Shah
(74) Attorney, Agent, or Firm—Oblon, Spivak, McClelland, Maier & Neustadt, P.C.

(57) ABSTRACT

In an ink composition, a coloring agent, a color developer, and a decolorization agent are dissolved or dispersed in a solvent. The ink is capable of being colored at 40° C. or less, with the coloring agent reacting with the color developer to form a bonded structure, and also capable of being decolorized when heated to 100° C. or more, with the bonded structure being ruptured to liberate the color developer therefrom, and the liberated color developer being chemically bonded to the decolorization agent. An ink jet printer is provided with a paper feeder for feeding a recording sheet for ink jet printing, a recorder for recording an ink image on the recording sheet fed from the paper feeder using the above-mentioned ink composition, and a paper discharger for discharging the recording sheet from the ink jet printer. By further providing an eraser, the ink image recorded on the recording sheet by the recorder can be erased, thereby achieving recycling of the recording sheet.

7 Claims, 2 Drawing Sheets

FIG. 1A
FIG. 1B
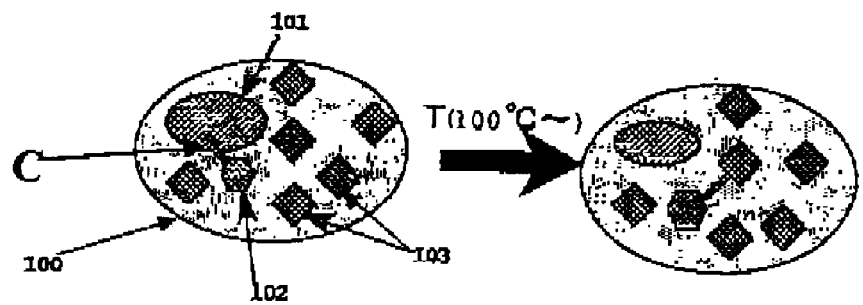
FIG. 2
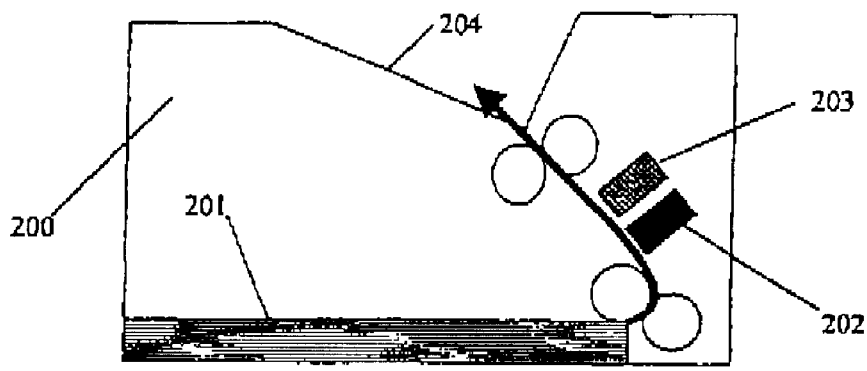
FIG. 3
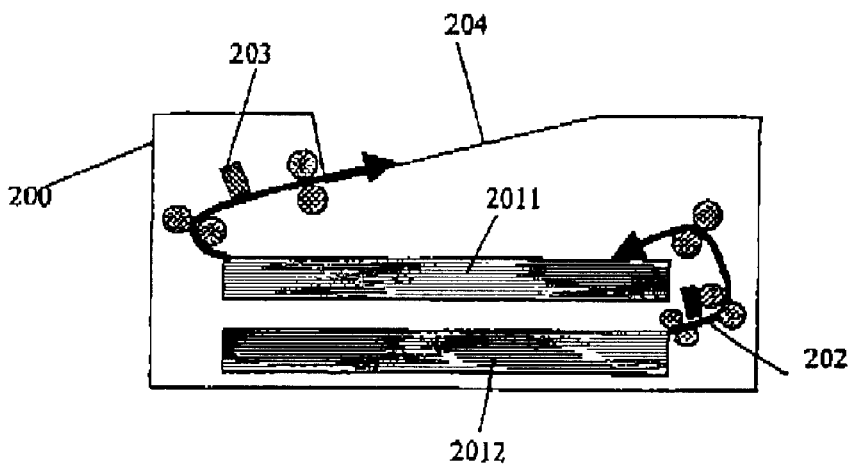

DECOLORIZABLE INK COMPOSITION AND INK JET PRINTER USING THE INK COMPOSITION

BACKGROUND OF THE INVENTION

1. Field of the Invention

The present invention relates to a decolorizable ink composition, namely, an ink composition capable of being decolorized by the application of heat thereto, and an ink jet printer using the above-mentioned ink composition.

2. Discussion of Background

With a recent spread of office automation, the volume of data to be processed has been rapidly increasing. For outputting such data, an enormous amount of paper is consumed as a recording medium. This causes a problem from the viewpoint of resource protection in the printing and copying fields.

To solve the above-mentioned problem, repeatable recording is demanded. Such repeatable recording has been investigated in the fields of electrophotographic recording and electrostatic recording. Further, an ink composition for recording and printing has also been studied to achieve repeatable recording.

Japanese Laid-Open Patent Application 4-362935 discloses a recording material capable of forming thereon images by recording or printing, which images can be erased from the recording material by the exposure to the near infrared rays. Another image can be again recorded or printed at the position from which the previous image has been erased. In this case, however, the recording or printing apparatus becomes necessarily complicated because the image erasure needs the near infrared rays. In addition, there is another problem that the printed image may not be completely erased even when exposed to the near infrared rays.

Japanese Laid-Open Patent Application 7-81236 discloses an ink composition which comprises a coloring compound, a color developer, and a desensitizer including an organic phosphoric compound having a decolorization action. A color image constituted of the above-mentioned ink composition formed on a sheet of paper can become colorless. However, it is still difficult to return the image-bearing sheet to the original state just like a fresh paper because of insufficient decolorization behavior of the ink composition.

Japanese Laid-Open Patent Application 10-88046 discloses a decolorizable ink composition comprising a coloring compound, a color developer, and a decolorization agent having the properties that can preferentially dissolve either the coloring compound or the color developer. An ink image prepared by this ink composition can be decolorized. However, the ink image cannot be perfectly erased, and the process for image erasure is very complicated because rapid cooling is required after heating.

SUMMARY OF THE INVENTION

Accordingly, a first object of the present invention is to provide an ink composition, in particular, suitable for a ink jet printer, capable of forming an ink image on a recording paper and erasing the ink image therefrom easily, rapidly, and completely, by the application of heat thereto, to such a degree that the recording paper from which the ink image has been erased can be repeatedly used.

A second object of the present invention is to provide an ink jet printer capable of carrying out image recording and image erasing simultaneously or selectively, with the structure of the ink jet printer being substantially equal to that of the conventional printer, aiming at light weight, thin and small size, and low cost.

The first object of the present invention can be achieved by an ink composition comprising a coloring agent, a color developer, a decolorization agent, and a solvent in which the coloring agent, the color developer, and the decolorization agent are dissolved or dispersed, the ink composition being capable of being colored at 40° C. or less, with the coloring agent reacting with the color developer to form a chemically bonded structure, and also capable of being decolorized when heated to 100° C. or more, with the chemically bonded structure being ruptured to liberate the color developer therefrom, and the liberated color developer being chemically bonded to the decolorization agent.

The second object of the present invention can be achieved by an ink jet printer comprising a paper feeding mechanism for feeding a recording sheet for ink jet printing, a recording mechanism for recording an ink image on the recording sheet fed from the paper feeding mechanism with the above-mentioned ink composition, and a paper discharging mechanism for discharging the recording sheet from the ink jet printer.

The above-mentioned ink jet printer may further comprise an erasing mechanism for erasing the ink image recorded on the recording sheet, the erasing mechanism comprising a heater, which is disposed along a passage for transporting the recording sheet between the paper feeding mechanism and the recording mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic diagram in explanation of the mechanism of color development and decolorization in an ink composition of the present invention.

FIG. 2 is a schematic cross sectional view showing one embodiment of an ink jet printer according to the present invention capable of both image recording and image erasing.

FIG. 3 is a schematic cross sectional view showing another embodiment of an ink jet printer according to the present invention capable of both image recording and image erasing.

DESCRIPTION OF THE PREFERRED EMBODIMENTS

Figure 4:
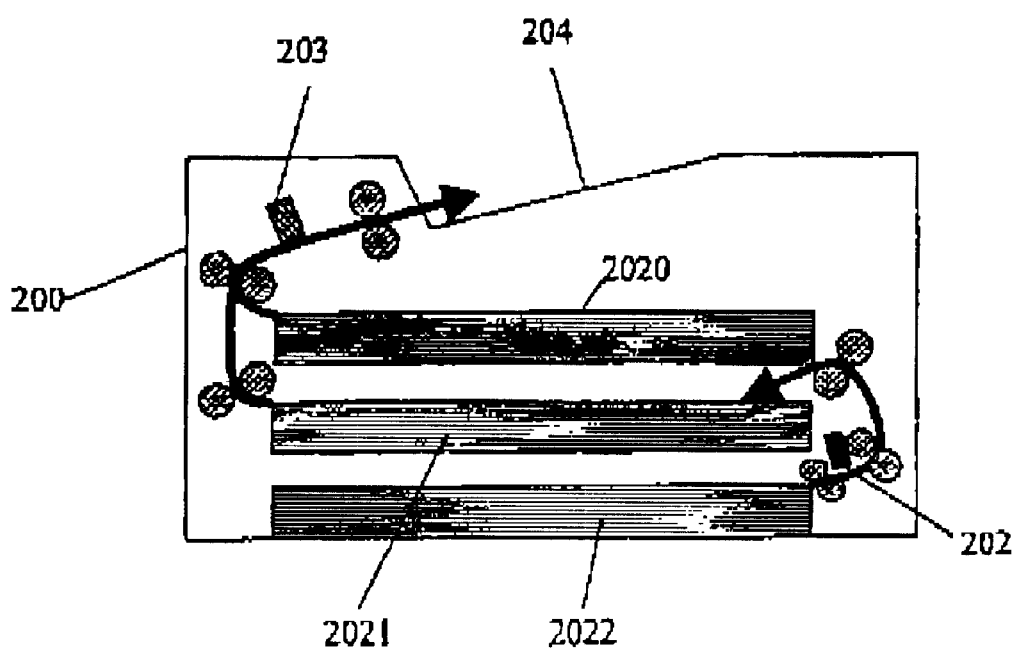
FIG. 4 is a schematic cross sectional view showing still another embodiment of an ink jet printer according to the present invention capable of both image recording and image erasing.

An ink composition of the present invention comprises a coloring agent, a color developer, a decolorization agent, and a solvent in which the coloring agent, the color developer, and the decolorization agent are dissolved or dispersed. The coloring agent is allowed to react with the color developer to form a chemically bonded structure at 40°

C. or less, preferably at a temperature in the range of room temperature to 40° C., that is, in the range of 20±5° C. to 40° C., with the result that the ink composition can be colored. The above-mentioned chemically bonded structure is ruptured to liberate the color developer therefrom when heated to 100° C. or more, and the liberated color developer is chemically bonded to the decolorization agent. Thus, decolorization takes place. Namely, a colored state is turned into a decolorized state.

The mechanism of coloring and decolorization in the ink composition according to the present invention will now be explained with reference to FIG. 1.

FIG. 1A is a schematic view showing a drop of an ink composition according to the present invention in a colored state at a temperature ranging from room temperature to 40° C. In FIG. 1A, a coloring agent 101, a color developer 102, and a decolorization agent 103 are dissolved in a drop of ink composition 100. At a temperature in the range of room temperature to 40° C., the coloring agent 101 and the color developer 102 form a bonded structure C, as indicated by C in FIG. 1A, through a chemical reaction.

FIG. 1B is a schematic view showing the above-mentioned drop of ink composition in a decolorized state, which is obtained by heating the ink drop in the above-mentioned colored state as shown in FIG. 1A to a temperature (T) of 100° C. or more.

In FIG. 1B, the chemically bonded structure C shown in FIG. 1A changes with an increase in temperature, and is finally ruptured. The color developer 102 is liberated from the bonded structure C and chemically bonded to the decolorization agent 103. Thus, the ink composition assumes a decolorized state. When an ink image is formed on an image support member, that is, a recording sheet, the ink image assumes a colorless transparent state at 100° C. or more, in other words, the ink image disappears. Furthermore, once the ink assumes a decolorized state (colorless transparent state) by heating the ink image to 100° C. or more, the decolorized state as shown in FIG. 1B can be maintained at room temperature. Therefore, the recording sheet can be used repeatedly.

Examples of the coloring agent for use in the present invention are as follows:
3,3-bis(p-dimethylaminophenyl)-6-dimethylaminophthalide (or Crystal Violet Lactone),
3,3-bis(p-dimethylaminophenyl)-6-diethylaminophthalide,
3,3-bis(p-dimethylaminophenyl)-6-chlorophthalide,
3,3-bis(p-diethylaminophenyl)-6-diethylaminophthalide,
3,3-bis(p-dibutylaminophenyl)phthalide,
3,3-bis(p-dimethylaminophenyl)-6-diethylaminoazaphthalide,
3-diethylamino-6-methyl-7-anilinofluoran,
3-(N-p-tolyl-N-ethylamino)-6-methyl-7-anilinofluoran,
3-N-methyl-N-amylamino-6-methyl-7-anilinofluoran,
3-diethylamino-7-(o-chloroanilino)fluoran,
3-dibutylamino-7-(o-chloroanilino)fluoran,
3-diethylamino-6-methyl-7-anilinofluoran,
6'-bromo-3'-methoxy-benzoindolino-spiropyran, and
3-(2'-hydroxy-4'-dimethylaminophenyl)-3-(2'-methoxy-5'-chlorophenyl)phthalide.

The color developer for use in the ink composition of the present invention is a material that is allowed to react with the coloring agent at 40° C. or less, thereby forming a bonded structure with the coloring agent so as to make the coloring agent assume a color development state.

Examples of such a color developer for use in the present invention include ethyl p-hydroxybenzoate, butyl p-hydroxybenzoate, benzyl p-hydroxybenzoate, 4,4-isopropylidenediphenol, 4,4-isopropylidenebis(2-chlorophenol), 4,4-isopropylidenebis(2-methylphenol), 4,4-isopropylidenebis(2,6-dimethylphenol), 4-hydroxyphenyl-2'-hydroxyphenylsulfone, catechol, resorcin, thymol, phloroglucin, phloroglucinolcarboxylic acid, N,N-diphenylthiourea, N-p-butylphenyl-N'-phenylthiourea, benzoic acid, 4-hydroxy-4'-chlorodiphenylsulfone, bis(4-hydroxyphenyl)sulfide, o-sulfophthalimide, and 5-octyl-o-sulfophthalimide.

The coloring agent and the color developer may be selected from the respective groups as mentioned above so that the chemical reaction will take place at 40° C. or less, preferably at a temperature in the range from room temperature to 40° C. In this case, a plurality of coloring agents and/or a plurality of color developers may be employed so long as the above-mentioned condition is satisfied.

The chemically bonded structure of the color developer and the coloring agent is ruptured and the color developer is separated from the above-mentioned bonded structure by heating the ink composition in a colored state to 100° C. or more. The decolorization agent for use in the present invention has the properties of forming a chemically bonded structure with the separated color developer at that temperature so as to decolorize the ink composition.

Such a decolorization agent has basicity and the ability to decolorize an electron donating organic material.

Specific examples of the decolorization agent are as follows:
N-methyl-N'-phenylacetylpiperazine,
N-phenyl-N'-phenylacetylpiperazine,
N-lauryl-N'-phenylacetylpiperazine,
N-benzyl-N'-phenylacetylpiperazine,
N-phenyl-N'-p-chlorobenzoylpiperazine,
N-benzyl-N'-benzenesulfonylpiperazine,
N-stearyl-N'-benzenesulfonylpiperazine,
N-phenyl-N'-benzenesulfonylpiperazine,
N,N'-bis(benzenesulfonyl)piperazine,
N,N'-bis(p-chlorobenzenesulfonyl)piperazine,
N-phenyl-N'-benzenesulfonylpiperazine,
N-butyl-N'-p-methylbenzenesulfonylpiperazine,
N-benzoylaminopropyl-N'-benzenesulfonylpiperazine,
N-benzoylaminobutyl-N'-benzenesulfonylpiperazine,
N-benzoylaminopropyl-N'-butanesulfonylpiperazine,
N,N'-bis(butylsulfonyl)piperazine,
N,N'-bis(laurylsulfonyl)piperazine,
N,N'-bis(cyclohexylsulfonyl)piperazine,
N-butylsulfonyl-N'-benzenesulfonylpiperazine,
N-(o-chlorobenzenesulfonyl)-N'-benzenesulfonylpiperazine,
N-(o-methylbenzoyl)-N'-benzenesulfonylpiperazine,
N,N'-bis(hexyloyl)piperazine,
N,N'-bis(cyclohexyloyl)piperazine,
N,N'-bis(p-methylphenylacetyl)piperazine,
N,N'-bis(phenylpropionyl)piperazine,
N,N'-bis(benzoyl)piperazine,
N,N'-bis(m-methylbenzoyl)piperazine,
N,N'-bis(o-butyryloxybenzoyl)piperazine,
N,N,N',N'-tetrabutylsuccinic acid diamide,
N,N,N',N'-tetrastearylsuccinic acid diamide,
N,N,N',N'-tetraphenyladipic acid diamide,
N,N,N',N'-tetrabutyladipic acid diamide,
N,N-dicyclohexyl-N',N'-dimethylsuccinic acid diamide,
N,N'-dicyclohexyl-N, N'-dimethylglutamic acid diamide,
N,N'-dimethyl-N,N'-dicyclohexylsebacic acid diamide,
N,N'-dimethyl-N,N'-dicyclohexylmalonic acid diamide,
N,N,N',N'-tetrabenzyladipic acid diamide, adipoyldipiperidone,
succinyl-di-3-chloro-ε-caprolactam,
N,N'-terephthaloylbispiperidine,
N,N'-isophthaloylbispiperidine,
N,N'-phthaloylbismorpholine,
N,N'-isophthaloyl-4-phenylpiperazine,
N,N'-phthaloylbiscaprolactam,
N,N'-terephthaloylbis-dibutylamine,
N,N'-isophthaloyl-dicyclohexylamine,
N,N'-isophthaloylbis-dibenzoylaminoethylamine,
N,N-terephthaloylbis(3-methylpiperidine),
N,N'-phthaloylbis(4-benzylpiperazine),
N,N'-isophthaloylbis(2-methoxycarbonylpiperidine),
N,N'-terephthaloylbis(5-ethyl-2-methylpiperidine),
N,N'-bis(benzoylaminobutyl)piperazine,
N-(p-chlorobenzoylaminoamyl)-N'-benzoylaminopropyl-piperazine,
N,N',N''-tribenzoyl-diethylenetriamine,
N,N'-isophthaloyldi(N-cyclohexyl-N-methylamide),
ethylenediaminetetraacetic acid tetraanilide, and
ethylenediaminetetraacetic acid tetracyclohexylamide.

Those decolorization agents may be used alone or in combination. It is preferable that the decolorization agents for use in the present invention have a melting point of 80° C. or more in light of the preservation stability of the produced ink images.

It is preferable to select a decolorization agent which is highly reactive with the employed color developer at 100° C. or more in order to improve the decolorization process.

It is preferable that 1 to 10 parts by weight of the color developer be used with 1 part by weight of the coloring agent. When the amount ratio of the color developer is within the above-mentioned range, the obtained image density is sufficient. At the same time, the solid content in the ink composition is not excessive, so that the ink properties such as fluidity do not decrease.

It is preferable that 1 to 20 parts by weight of the decolorization agent be used with 1 part by weight of the coloring agent. When the amount ratio of the decolorization agent is within the above-mentioned range, ink images can completely disappear without any residual image, and a decrease in image density can be prevented.

The ink composition of the present invention may further comprise additives conventionally used. For example, a surfactant and dispersion stabilizer for dispersing solid components in an ink composition in a stable manner, an ultraviolet absorber for inhibiting photo-decomposition of the coloring components, a stabilizer such as an antioxidant, a wetting agent, and an anti-foaming agent may be contained in the ink composition.

As the solvent for use in the ink composition, water is preferable. The concentration of the solid components taking part in coloring and decolorization performance in a solvent, which may be determined according to the application of the ink, may be preferably in the range of 0.1 to 10 wt. %. Such a concentration can provide a sufficient image density without an increase in viscosity and a decrease in fluidity. It is preferable that the solid components dispersed in the solvent be in the form of particles of the order of sub-micrometer, including no coarse particles with a particle size of 10 μm or more.

As mentioned above, the concentration of the solid components in the ink composition is preferably in the range of 0.1 to 10 wt. %. In particular, when the ink composition of the present invention is used for an ink jet printer, the concentration of the solid components is preferably 10 wt. % or less. When the concentration exceeds 10 wt. % or more, there is a risk of nozzles for use in the ink jet printer being clogged.

The ink jet printer according to the present invention will now be explained in detail.

The ink jet printer of the present invention is provided with a paper feeding mechanism for feeding a recording sheet for ink jet printing, a recording mechanism for recording an ink image on the recording sheet fed from the paper feeding mechanism with the previously mentioned ink composition of the present invention, and a paper discharging mechanism for discharging the recording sheet from the ink jet printer.

The ink jet printer may further comprise an erasing mechanism for erasing the ink image recorded on the recording sheet, with the erasing mechanism comprising a heater capable of selectively giving off heat, which erasing mechanism is disposed along a passage for transporting the recording sheet between the paper feeding mechanisms and the recording mechanism.

After a recording sheet is subjected to a recording operation to form ink images thereon using the above-mentioned ink jet printer, the ink images can be easily erased from the recording sheet by heating the ink images to 100° C. or more. Therefore, the recording sheet can be repeatedly used.

The structure of the ink jet printer according to the present invention will be explained with reference to FIG. 2.

FIG. 2 is a schematic cross sectional view showing one embodiment of the ink jet printer of the present invention capable of both image recording and image erasure. In an ink jet printer 200 of FIG. 2, a paper feeder 201 holds recording sheets, each bearing thereon ink images which are obtained by the recording operation using this printer. A recorder is provided with a recording head 203, and an eraser is provided with a heater 202. The recording head 203 and the heater 202 are arranged along a passage for transporting the recording sheet in such a configuration that the heater 202 is disposed upstream of the recording head 203 in terms of the transporting direction of the recording sheet. Reference numeral 204 indicates a paper discharger.

With both the heater 202 and the recording head 203 being actuated in the ink jet printer of FIG. 2, an image-bearing recording sheet exiting from the paper feeder 201 is heated by the heater 202 to erase the image from the recording sheet, and thereafter, a new image is recorded on the recording sheet using the recording head 203. The recording sheet which bears thereon a new image is discharged from the printer by the paper discharger 204. As a matter of course, the new image is formed as though being printed on a fresh paper because the image previously printed on the recording sheet is completely erased therefrom.

The ink jet printer of FIG. 2 is considered to be suitable for recycling of image-bearing recording sheets because both image recording and image erasing can be achieved in the same printer.

FIG. 3 is a schematic cross sectional view showing another embodiment of the ink jet printer according to the present invention.

The ink jet printer of FIG. 3 is obtained by modifying the printer of FIG. 2 so that image recording and image erasing can be independently carried out in the printer.

In general, after image-bearing recording sheets become unnecessary, they are collected for recycling by many and unspecified persons intermittently and irregularly in offices. The operating time of the printer, that is, the time when recording is being carried out, is comparatively short in a whole working day. Namely, for the printer, the time when no recording is being made is overwhelmingly long. Therefore, it is possible to make the best use of time if the image erasing operation is carried out on the image-bearing recording sheets while the printer is not required to perform the image recording operation. In this sense, the ink jet printer of FIG. 3 is designed to put the above-mentioned theory into practice.

To be more specific, in an ink jet printer 200 of FIG. 3, a paper feeder includes a first paper feeding unit 2012 for holding recording sheets, each bearing thereon ink images to be erased, and a second paper feeding unit 2011 for holding recording sheets free of ink images to be erased. The second paper feeding unit 2011 is disposed downstream of the first paper feeding unit 2012 in terms of the transporting direction of the recording sheets.

This printer 200 is also provided with means for controlling the recorder although not shown in the figure. The function of this means is as follows: When an image-free recording sheet is discharged from the second paper feeding unit 2011, only a recording head 203 is actuated; while when an image-bearing recording sheet is discharged from the first paper feeding unit 2012, both the recording head 203 and a heater 202 are actuated.

Furthermore, there may be provided with another means for controlling the recording and erasing operations in response to a recording request. More specifically, while there is no request to start the recording operation, the controlling means allows each of the image-bearing recording sheets to be discharged from the first paper feeding unit 2012 to perform the erasing operation using the heater 202 that is simultaneously actuated by this controlling means. Those recording sheets from which ink images are thus deleted may be sent to the second paper feeding unit 2011 and held therein.

In the second paper feeding unit 2011, recording sheets to be subjected to only the recording operation may be held. Namely, the second paper feeding unit 2011 may hold therein not only recording sheets fed from the first paper feeding unit 2012 after the erasing operation by use of the heater 202, but also fresh recording sheets.

Upon the request to start the recording operation, a recording sheet is discharged from the second paper feeding unit 2011 and ink images are recorded on the recording sheet using the recording head 203. After the completion of image recording, the image-bearing recording sheet is discharged using a paper discharger 204. The heater 202 and the recording head 203 may be mutually exclusively actuated.

Owing to such a structure as shown in FIG. 3, only if image-bearing recording sheets are held in the first paper feeding unit 2012, is it possible to automatically replenish the second paper feeding unit 2011 with image-free recording sheets even though the recording sheets in the second paper feeding unit 2011 are lacking.

A still another embodiment of the ink jet printer according to the present invention is illustrated in FIG. 4.

An ink jet printer 200 shown in FIG. 4 is obtained by further improving the ink jet printer of FIG. 3. The ink jet printer 200 is provided with a paper feeding unit with a three-step structure, that is, a first paper feeding unit 2022, a second paper feeding unit 2021, and a third paper feeding unit 2020.

To be more specific, the first paper feeding unit 2022 holds therein recording sheets, each bearing thereon ink images to be erased, the second paper feeding unit 2021 holds therein recording sheets free of ink images to be erased, fed from the first paper feeding unit 2022, and the third paper feeding unit 2020 mainly holds therein fresh recording sheets free of ink images. The second paper feeding unit 2021 is disposed downstream of the first paper feeding unit 2022, and the third paper feeding unit 2020 is disposed downstream of the second paper feeding unit 2021, in terms of the transporting direction of recording sheets. A heater 202 is arranged for the image erasing operation along the passage between the first paper feeding unit 2022 and the second paper feeding unit 2021.

The ink jet printer of FIG. 4 may further comprise means for controlling the recorder in the same manner as mentioned above. Namely, owing to the control means, when a recording sheet is discharged from the second paper feeding unit 2021, or a fresh recording sheet is discharged from the third paper feeding unit 2020, only a recording head 203 is actuated.

On the other hand, when the image-bearing recording sheet is discharged from the first paper feeding unit 2022, both the heater 202 and a recording head 203 are actuated.

In addition, a selection means (not shown) may also be provided to select the use of the recording sheets either from the second paper feeding unit 2021 or from the third paper feeding unit 2020.

The mechanism of image recording and image erasing in the ink jet printer of FIG. 4 is substantially the same as that of FIG. 3. However, in the printer of FIG. 4, the use of the recording sheets from the third paper feeding unit 2020 or the second paper feeding unit 2021 can be selected for recording operation by the above-mentioned selection means.

For instance, the use of recording sheets from the third paper feeding unit 2020 is chosen by the selection means in the case where a printed matter demands high image quality, that is, the printed matter is a document to be submitted outside a company. In contrast to this, most of general documents circulated in the company are not severely requested to have high image quality. The number of the latter documents is generally more than that of the former documents. Therefore, the latter documents may be prepared by choosing the use of recording sheets from the second paper feeding unit 2021 by the selection means. Thus, recycling of paper can be effectively accomplished, so that the ink jet printer of FIG. 4 of the present invention can greatly contribute to resource saving and protection of office environment.

Furthermore, the ink jet printer of FIG. 4 may be provided with means for controlling the recording and erasing operations in response to a recording request in the same manner as mentioned in the description of FIG. 3. More specifically, when no recording is being performed, the image-bearing recording sheets are caused to exit from the first paper feeding unit 2022 to perform the image erasing operation using the heater 202 that is actuated simultaneously with the transportation of the recording sheets from the first paper feeding unit 2022. Those recording sheets may be sent to the second paper feeding unit 2021 and held therein. In response to a request for recording, the use of a recording sheet held in the second paper feeding unit 2021 or a recording sheet in the third paper feeding unit 2020 is chosen, and the recording sheet thus chosen is sent to the recording head 203, thereby carrying out the image recording. Thereafter, the image-bearing recording sheet is discharged using a paper discharger 204. In this case, the heater 202 and the recording head 203 may be mutually exclusively actuated.

The structure shown in FIG. 4 can also realize automatic paper supply in the same manner as in FIG. 3.

Figure 5A:
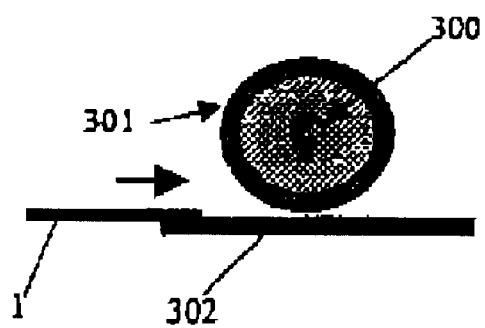
FIG. 5A and FIG. 5B are schematic diagrams, each showing an embodiment of a heater for erasing an ink image provided in an ink jet printer according to the present invention.
Figure 5B:
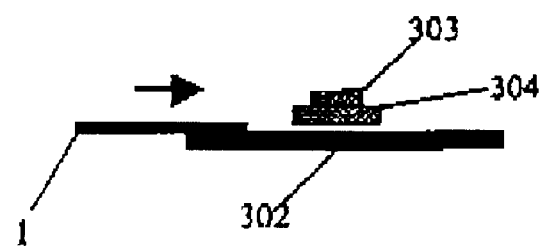

The heater 202 in the ink jet printers shown in FIG. 2, FIG. 3, and FIG. 4 will be explained in detail. A heat roller as shown in FIG. 5A, that is conventionally used in an image fixing unit of a copying machine, can be employed as the heater 202 in the ink jet printer of the present invention. The heat roller shown in FIG. 5A is constructed of a halogen heater 300 and a hollow cylinder made of an aluminum thin plate. Alternatively, there can be used a linear type heat source, as shown in FIG. 5B, which is designed to extend in the lengthwise direction of the passage for conveying recording sheets. The linear type heater is formed by the combination of a plane-shaped heating element 303, for example, made of ceramics, and a member 304 with a high heat conductivity.

An image-bearing recording sheet 1 is transported along a transporting guide 302, and heat is applied to the image-bearing recording sheet 1 using the heater as shown in FIG. 5A or 5B. The nip length, that is, the contact length of a heating portion of the heater with the image-bearing recording sheet, and the linear velocity, that is, the transporting speed of the recording sheet may he determined according to the decolorization temperature of the employed ink composition of the present invention to constitute the image on the recording sheet.

Other features of this invention will become apparent in the course of the following description of exemplary embodiments, which are given for illustration of the invention and are not intended to be limiting thereof.

EXAMPLE

A mixture of the following components was dispersed and pulverized in a sand mill until the particle diameters of the solid components reached 1 to 0.1 μm.

|  | Parts by Weight |
|---|---|
| Crystal Violet Lactone (coloring agent) | 1 |
| 4,4'-isopropylidene diphenol (color developer) | 3 |
| N,N'-isophthaloyldi (N-cyclohexyl-N-methylamide) (decolorization agent) | 8 |
| Itaconic-acid-modified poly (vinyl alcohol) | 20 |
| Distilled water | 100 |

Distilled water was further added to the above prepared mixture so that the concentration of the solid components was 3 wt. %. The resultant mixture was dispersed, whereby an ink composition of the present invention was prepared.

When an image was formed on a recording sheet using the above-mentioned ink composition, it was possible to obtain a colored image at 25° C. Thereafter, the obtained image was decolorized by heating the image to 110° C.

An ink image formed on a recording sheet using the ink composition of the present invention can be easily and readily deleted by the application of heat to the ink image. By using the ink of the present invention for recording operation, the recording sheet can be repeatedly used.

The ink composition of the present invention exhibits excellent decolorization performance by the application of heat. Therefore, in a similar manner as in a fresh paper, high quality images can be again produced on a recycled recording sheet from which an ink image has been erased.

The ink jet printer of the present invention employs the above-mentioned ink composition, so that ink images once recorded on a recording sheet can be easily deleted by the application of heat. The ink jet printer of the present invention is suitable for recycling of recording sheets.

A paper feeding section in the above-mentioned ink jet printer may be divided into a paper feeding unit for image-bearing recording sheets and a paper feeding unit for image-free recording sheets. While there is no request for recording operation, the image-bearing recording sheets may be subjected to the image erasing operation and the image-free recording sheets thus obtained may be held in the paper feeding unit for image-free recording sheets. Thus, automatic paper supply mechanism can be attained.

In addition, by separately providing a paper feeding unit for recyclable recording sheets from which ink images have been erased and a paper feeding unit for fresh recording sheets, the use of recording sheets to be subjected to ink jet printing may be chosen depending upon the required image quality.

Japanese Patent Application No. 2000-124780 filed Apr. 25, 2000 is hereby incorporated by reference.

What is claimed is:

1. An ink composition comprising: a coloring agent,
a color developer,
at least one decolorization agent selected from the group consisting of N-methyl-N'-phenylacetylpiperazine, N-phenyl-N'-phenylacetylpiperazine, N-lauryl-N'-phenylacetylpiperazine, N-benzyl-N'-phenylacetylpiperazine, N-phenyl-N'-p-chlorobenzoylpiperazine, N-benzyl-N'-benzenesulfonylpiperazine, N-stearyl-N'-benzenesulfonylpiperazine, N-phenyl-N'-benzenesulfonylpiperazine, N,N'-bis(benzenesulfonyl)piperazine, N,N'-bis(p-chlorobenzenesulfonyl)piperazine, N-phenyl-N'-benzenesulfonylpiperazine, N-butyl-N'-p-methylbenzenesulfonylpiperazine, N-benzoylaminopropyl-N'-benzenesulfonylpiperazine, N-benzoylaminobutyl-N'-benzenesulfonylpiperazine, N-benzoylaminopropyl-N'-butanesulfonylpiperazine, N,N'-bis(butylsulfonyl)piperazine, N,N'-bis(laurylsulfonyl)piperazine, N,N'-bis(cyclohexylsulfonyl)piperazine, N-butylsulfonyl-N'-benzenesulfonylpiperazine, N-(o-chlorobenzenesulfonyl)-N'-benzenesulfonylpiperazine, N-(o-methylbenzoyl)-N'-benzenesulfonylpiperazine, N,N'-bis(hexyloyl)piperazine, N,N'-bis(cyclohexyloyl)piperazine, N,N'-bis(p-methylphenylacetyl)piperazine, N,N'-bis(phenylpropionyl)piperazine, N,N'-bis(benzoyl)piperazine, N,N'-bis(m-methylbenzoyl)piperazine, N,N'-bis(o-butyryloxybenzoyl)piperazine, N,N,N',N'-tetrabutylsuccinic acid diamide, N,N,N',N'-tetrastearylsuccinic acid diamide, N,N,N',N'-tetraphenyladipic acid diamide, N,N,N',N'-tetrabutyladipic acid diamide, N,N-dicyclohexyl-N',N'-dimethylsuccinic acid diamide, N,N'-dicyclohexyl-N,N'-dimethylglutamic acid diamide, N,N'-dimethyl-N,N'-dicyclohexylsebacic acid diamide, N,N'-dimethyl-N,N'-dicyclohexylmalonic acid diamide, N,N,N',N'-tetrabenzyladipic acid diamide, adipoyldipiperidone, succinyl-di-3-chloro-ε-caprolactam, N,N'-terephthaloylbispiperidine, N,N'-isophthaloylbispiperidine, N,N'-phthaloylbismorpholine, N,N'-isophthaloyl-4-phenylpiperazine, N,N'-phthaloylbiscaprolactam, N,N'-terephthaloylbis-dibutylamine, N,N'-isophthaloyl-dicyclohexylamine, N,N'-isophthaloylbis-dibenzoylaminoethylamine, N,N-terephthaloylbis(3-methylpiperidine), N,N'-phthaloylbis(4-benzylpiperazine), N,N'-isophthaloylbis(2-methoxycarbonylpiperidine), N,N'-terephthaloylbis(5-ethyl-2methylpiperidine), N,N'-bis (benzoylaminobutyl)piperazine, N-(p-chlorobenzoylaminoamyl)-N'-benzoylaminopropylpiperazine, N,N',N''-tribenzoyl-diethylenetriamine, N,N'-isophthaloyldi(N-cyclohexyl-N-methylamide), ethylenediaminetetraacetic acid tetraanilide, and ethylenediaminetetraacetic acid tetracyclohexylamide, and a solvent in which said coloring agent, said color developer, and said decolorization agent are dissolved or dispersed, said ink composition being capable of being colored at 40° C. or less, with said coloring agent reacting with said color developer to form a chemically bonded structure, and also capable of being decolorized when heated to 100° C. or more, with said chemically bonded structure being ruptured to liberate said color developer therefrom, and said liberated color developer being chemically bonded to said decolorization agent.

2. An ink jet printer comprising:

a paper feeding mechanism for feeding a recording sheet for ink jet printing, a recording mechanism for recording an ink image on said recording sheet fed from said paper feeding mechanism with an ink composition, and a paper discharging mechanism for discharging said recording sheet from said ink jet printer, wherein said ink composition comprises a coloring agent, a color developer, a decolorization agent, and a solvent in which said coloring agent, said color developer, and said decolorization agent are dissolved or dispersed, said ink composition being capable of being colored at 40° C. or less, with said coloring agent reacting with said color developer to form a chemically bonded structure, and also capable of being decolorized when heated to 100° C. or more, with said chemically bonded structure being ruptured to liberate said color developer, and said liberated color developer being chemically bonded to said decolorization agent said decolorization agent being at least one decolorization agent selected from the group consisting of N-methyl-N'-phenylacetylpiperazine, N-phenyl-N'-phenylacetylpiperazine, N-lauryl-N'-phenylacetylpiperazine, N-benzyl-N'-phenylacetylpiperazine, N-phenyl-N'-p-chlorobenzoylpiperazine, N-benzyl-N'-benzenesulfonylpiperazine, N-stearyl-N'-benzenesulfonylpiperazine, N-phenyl-N'benzenesulfonylpiperazine, N,N'-bis(benzenesulfonyl)piperazine, N,N'-bis(p-chlorobenzenesulfonyl)piperazine, N-phenyl-N'-benzenesulfonylpiperazine, N-butyl-N'-p-methylbenzenesulfonylpiperazine, N-benzoylaminopropyl-N'-benzenesulfonylpiperazine, N-benzoylaminobutyl-N'-benzenesulfonylpiperazine, N-benzoylaminopropyl-N'-butanesulfonylpiperazine, N,N'-bis(butylsulfonyl)piperazine, N,N'-bis(laurylsulfonyl)piperazine, N,N'-bis(cyclohexylsulfonyl)piperazine, N-butylsulfonyl-N'-benzenesulfonylpiperazine, N-(o-chlorobenzenesulfonyl)-N'-benzenesulfonylpiperazine, N-(o-methylbenzoyl)-N'-benzenesulfonylpiperazine, N,N'-bis(hexyloyl)piperazine, N,N'-bis(cyclohexyloyl)piperazine, N,N'-bis(p-methylphenylacetyl)piperazine, N,N'-bis(phenylpropionyl)piperazine, N,N'-bis(benzoyl)piperazine, N,N'-bis(m-methylbenzoyl)piperazine, N,N'-bis(o-butyryloxybenzoyl)piperazine, N,N,N',N'-tetrabutylsuccinic acid diamide, N,N,N',N'-tetrastearylsuccinic acid diamide, N,N,N',N'-tetraphenyladipic acid diamide, N,N,N',N'-tetrabutyladipic acid diamide, N,N-dicyclohexyl-N',N'-dimethylsuccinic acid diamide, N,N'-dicyclohexyl-N,N'-dimethylglutamic acid diamide, N,N'-dimethyl-N,N'-dicyclohexylsebacic acid diamide, N,N'-dimethyl-N,N'-dicyclohexylmalonic acid diamide, N,N,N',N'-tetrabenzyladipic acid diamide, adipoyldipiperidone, succinyl-di-3-chloro-ε-caprolactam, N,N'-terephthaloylbispiperidine, N,N'-isophthaloylbispiperidine, N,N'-phthaloylbismorpholine, N,N'-isophthaloyl-4-phenylpiperazine, N,N'-phthaloylbiscaprolactam, N,N'-terephthaloylbis-dibutylamine, N,N'-isophthaloyl-dicyclohexylamine, N,N'-isophthaloylbis-dibenzoylaminoethylamine, N,N-terephthaloylbis(3-methylpiperidine), N,N'-phthaloylbis(4-benzylpiperazine), N,N'-isophthaloylbis(2-methoxycarbonylpiperidine), N,N'-terephthaloylbis(5-ethyl-2-methylpiperidine), N,N'-bis(benzoylaminobutyl)piperazine, N-(p-chlorobenzoylaminoamyl)-N'-benzoylaminopropylpiperazine, N,N',N''-tribenzoyl-diethylenetriamine, N,N'-isophthaloyldi(N-cyclohexyl-N-methylamide), ethylenediaminetetraacetic acid tetraanilide, and ethylenediaminetetraacetic acid tetracyclohexylamide.

3. The ink jet printer as claimed in claim 2, further comprising an erasing mechanism for erasing said ink image recorded on said recording sheet, wherein said erasing mechanism comprises a heater capable of selectively applying heat to said ink image recorded on said recording sheet for erasing said ink image, and said erasing mechanism is disposed along a passage for transporting said recording sheet between said paper feeding mechanism and said recording mechanism.

4. An ink jet printer comprising:

a paper feeder for feeding a recording sheet for ink jet printing, a recorder for recording an ink image on said recording sheet fed from said paper feeder with an ink composition, and a paper discharger for discharging said recording sheet from said ink jet printer, wherein said ink composition comprises a coloring agent, a color developer, a decolorization agent, and a solvent in which said coloring agent, said color developer, and said decolorization agent are dissolved or dispersed, said ink composition being capable of being colored at 40° C. or less, with said coloring agent reacting with said color developer to form a chemically bonded structure, and also capable of being decolorized when heated to 100° C. or more, with said chemically bonded structure being ruptured to liberate said color developer, and said liberated color developer-being chemically bonded to said decolorization agent said decolorization agent being at least one decolorization agent selected from the group consisting of N-methyl-N'-phenylacetylpiperazine, N-phenyl-N'-phenylacetylpiperazine, N-lauryl-N'-phenylacetylpiperazine, N-benzyl-N'-phenylacetylpiperazine, N-phenyl-N'-p-chlorobenzoylpiperazine, N-benzyl-N'-benzenesulfonylpiperazine, N-stearyl-N'-benzenesulfonylpiperazine, N-phenyl-N'-benzenesulfonylpiperazine, N,N'-bis(benzenesulfonyl)

piperazine, N,N'-bis(p-chlorobenzenesulfonyl) piperazine, N-phenyl-N'-benzenesulfonylpiperazine, N-butyl-N'-p-methylbenzenesulfonylpiperazine, N-benzoylaminopropyl-N'-benzenesulfonylpiperazine, N-benzoylaminobutyl-N'-benzenesulfonylpiperazine, N-benzoylaminopropyl-N'-butanesulfonylpiperazine, N,N'-bis(butylsulfonyl)piperazine, N,N'-bis(laurylsulfonyl)piperazine, N,N'-bis(cyclohexylsulfonyl)piperazine, N-butylsulfonyl-N'-benzenesulfonylpiperazine, N-(o-chlorobenzenesulfonyl)-N'-benzenesulfonylpiperazine, N-(o-methylbenzoyl)-N'-benzenesulfonylpiperazine, N,N'-bis(hexyloyl)piperazine, N,N'-bis(cyclohexyloyl)piperazine, N,N'-bis(p-methylphenylacetyl)piperazine, N,N'-bis(phenylpropionyl)piperazine, N,N'-bis(benzoyl)piperazine, N,N'-bis(m-methylbenzoyl)piperazine, N,N'-bis(o-butyryloxybenzoyl)piperazine, N,N,N',N'-tetrabutylsuccinic acid diamide, N,N,N',N'-tetrastearylsuccinic acid diamide, N,N,N',N'-tetraphenyladipic acid diamide, N,N,N',N'-tetrabutyladipic acid diamide, N,N-dicyclohexyl-N',N'-dimethylsuccinic acid diamide, N,N'-dicyclohexyl-N,N'-dimethylglutamic acid diamide, N,N'-dimethyl-N,N'-dicyclohexylsebacic acid diamide, N,N'-dimethyl-N,N'dicyclohexylmalonic acid diamide, N,N,N',N'-tetrabenzyladipic acid diamide, adipoyldipiperidone, succinyl-di-3-chloro-ϵ-caprolactam, N,N'-terephthaloylbispiperidine, N,N'-isophthaloylbispiperidine, N,N'-phthaloylbismorpholine, N,N'-isophthaloyl-4-phenylpiperazine, N,N'-phthaloylbiscaprolactam, N,N'-terephthaloylbis-dibutylamine, N,N'-isophthaloyl-dicyclohexylamine, N,N'-isophthaloylbis-dibenzoylaminoethylamine, N,N-terephthaloylbis(3-methylpiperidine), N,N'-phthaloylbis(4-benzylpiperazine), N,N'-isophthaloylbis(2-methoxycarbonylpiperidine), N,N'-terephthaloylbis(5-ethyl-2-methylpiperidine), N,N'-bis(benzoylaminobutyl)piperazine, N-(p-chlorobenzoylaminoamyl)-N'-benzoylaminopropylpiperazine, N,N',N''-tribenzoyl-diethylenetriamine, N,N'-isophthaloyldi(N-cyclohexyl-N-methylamide), ethylenediaminetetraacetic acid tetraanilide, and ethylenediaminetetraacetic acid tetracyclohexylamide.

5. The ink jet printer as claimed in claim 4, further comprising an eraser for erasing said ink image recorded on said recording sheet, wherein said eraser comprises a heater capable of selectively applying heat to said ink image recorded on said recording sheet for erasing said ink image, and said eraser is disposed along a passage for transporting said recording sheet between said paper feeder and said recorder.

6. An ink jet printer comprising:
means for feeding a recording sheet for ink jet printing,
means for recording an ink image on said recording sheet fed from said paper feeding means with an ink composition, and
means for discharging said recording sheet from said ink jet printer, wherein said ink composition comprises a coloring agent, a color developer, a decolorization agent, and a solvent in which said coloring agent, said color developer, and said decolorization agent are dissolved or, dispersed, said ink composition being capable of being colored at 40° C. or less, with said coloring agent reacting with said color developer to form a chemically bonded structure, and also capable of being decolorized when heated to 100° C. or more, with said chemically bonded structure being ruptured to liberate said color developer, and said liberated color developer being chemically bonded to said decolorization agent said decolorization agent being at least one decolorization agent selected from the group consisting of N-methyl-N'-phenylacetylpiperazine, N-phenyl-N'-phenylacetylpiperazine, N-lauryl-N'-phenylacetylpiperazine, N-benzyl-N'-phenylacetylpiperazine, N-phenyl-N'-p-chlorobenzoylpiperazine, N-benzyl-N'-benzenesulfonylpiperazine, N-stearyl-N'-benzenesulfonylpiperazine, N-phenyl-N'-benzenesulfonylpiperazine, N,N'-bis(benzenesulfonyl) piperazine, N,N'-bis(p-chlorobenzenesulfonyl) piperazine, N-phenyl-N'-benzenesulfonylpiperazine, N-butyl-N'-p-methylbenzenesulfonylpiperazine, N-benzoylaminopropyl-N'-benzenesulfonylpiperazine, N-benzoylaminobutyl-N'-benzenesulfonylpiperazine, N-benzoylaminopropyl-N'-butanesulfonylpiperazine, N,N'-bis(butylsulfonyl)piperazine, N,N'-bis(laurylsulfonyl)piperazine, N,N'-bis(cyclohexylsulfonyl)piperazine, N-butylsulfonyl-N'-benzenesulfonylpiperazine, N-(o-chlorobenzenesulfonyl)-N'-benzenesulfonylpiperazine, N-(o-methylbenzoyl)-N'-benzenesulfonylpiperazine, N,N'-bis(hexyloyl)piperazine, N,N'-bis(cyclohexyloyl)piperazine, N,N'-bis(p-methylphenylacetyl)piperazine, N,N'-bis(phenylpropionyl)piperazine, N,N'-bis(benzoyl)piperazine, N,N'-bis(m-methylbenzoyl)piperazine, N,N'-bis(o-butyryloxybenzoyl)piperazine, N,N,N',N'-tetrabutylsuccinic acid diamide, N,N,N',N'-tetrastearylsuccinic acid diamide, N,N,N',N'-tetraphenyladipic acid diamide, N,N,N',N'-tetrabutyladipic acid diamide, N,N-dicyclohexyl-N',N'-dimethylsuccinic acid diamide, N,N'-dicyclohexyl-N,N'-dimethylglutamic acid diamide, N,N'-dimethyl-N,N'-dicyclohexylsebacic acid diamide, N,N'-dimethyl-N,N'-dicyclohexylmalonic acid diamide, N,N,N',N'-tetrabenzyladipic acid diamide, adipoyldipiperidone, succinyl-di-3-chloro-ϵ-caprolactam, N,N'-terephthaloylbispiperidine, N,N'-isophthaloylbispiperidine, N,N'-phthaloylbismorpholine, N,N'-isophthaloyl-4-phenylpiperazine, N,N'-phthaloylbiscaprolactam, N,N'-terephthaloylbis-dibutylamine, N,N'-isophthaloyl-dicyclohexylamine, N,N'-isophthaloylbis-dibenzoylaminoethylamine, N,N-terephthaloylbis(3-methylpiperidine), N,N'-phthaloylbis(4-benzylpiperazine), N,N'-isophthaloylbis(2-methoxycarbonylpiperidine), N,N'-terephthaloylbis(5-ethyl-2-methylpiperidine), N,N'-bis(benzoylaminobutyl)piperazine, N-(p-chlorobenzoylaminoamyl)-N'-benzoylaminopropylpiperazine, N,N',N''-tribenzoyl-diethylenetriamine, N,N'-isophthaloyldi(N-cyclohexyl-N-methylamide), ethylenediaminetetraacetic acid tetraanilide, and ethylenediaminetetraacetic acid tetracyclohexylamide.

7. The ink jet printer as claimed in claim 6, further comprising means for erasing said ink image recorded on said recording sheet, wherein said erasing means comprises a heater capable of selectively applying heat to said ink image recorded on said recording sheet for erasing said ink image, and said erasing means is disposed along a passage for transporting said recording sheet between said paper feeding means and said recording means.

* * * * *